United States Patent Office 3,271,453
Patented Sept. 6, 1966

3,271,453
2,5-DI-TERT-BUTYL-N,N'-DIARYL-p-PHENYLENEDIAMINES
Ernest Csendes, Atlanta, Ga., assignor to E. I. du Pont de Nemours and Company, Wilmington, Del., a corporation of Delaware
No Drawing. Filed Jan. 22, 1962, Ser. No. 167,938
5 Claims. (Cl. 260—576)

This invention relates to new and improved N,N'-diaryl-p-phenylenediamines and to elastomeric compositions which contain said new compounds as antioxidants. This invention further relates to a process for the preparation of these new compounds.

While N,N'-diaryl-p-phenylenediamines are highly active antioxidants for elastomers, particularly for natural rubber, their utility is somewhat curtailed by the their poor soluiblity in elastomers. Because of this poor solubility there is a tendency for the compound to migrate to the surface of the elastomer, thereby producing an undesirable "bloom" and decreasing the amount of the antioxidant present therein. The term, elastomer, includes natural rubber and synthetic rubber.

It is an object of this invention to provide new compounds having improved solubility in an elastomer and which retain the good antioxidant properties of the N,N'-diaryl-p-phenylenediamines. It is also an object of this invention to provide a process for the preparation of these compounds. A still further object is to provide elastomeric compositions and cured elastomers which contain the new, more soluble, antioxidants. Other objects will appear hereinafter.

These and other objects are accomplished by the new 2,5-di-tert-butyl-N,N'-diaryl-p-phenylenediamines of the formula

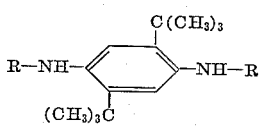

where R is an aryl of the phenyl or naphthyl series which may be substituted with lower alkyl radicals. These new compounds are prepared by reacting 2,5-di-tert-butylhydroquinone with the corresponding arylamine or its hydrochloride under certain reaction conditions. Elastomeric compositions and cured elastomers containing the new antioxidants of increased solubility are hereinafter provided.

Representative examples of compounds to be made in accordance with this invention are:

2,5-di-tert-butyl-N,N'-diphenyl-p-phenylenediamine,
2,5-di-tert-butyl-N,N'-di-o-tolyl-p-phenylenediamine,
2,5-di-tert-butyl-N,N',-di-1-naphthyl-p-phenylenediamine.

The compounds of this invention are made by heating 2,5-di-tert-butylhydroquinone with a phenylamine, naphthylamine, lower alkyl substituted phenylamine, lower alkyl substituted naphthylamine, or their hydrochloride at 220–250° C. in the presence of hydrogen chloride. The molten reaction materials are used as the reaction medium into which gaseous hydrochloric acid is introduced.

It is preferred to use a stoichiometric excess of the amine in order to more completely utilize the more expensive 2,5-di-tert-butylhydroquinone.

When the reaction is completed the product is isolated by conventional methods. For example, the excess amine may be removed by steam distillation, and the product may then be further purified by distillation, crystallization, etc.

The compounds of this invention are effective antioxidants for natural rubber and synthetic rubber, particularly that which is prepared from conjugated hydrocarbon dienes, such as butadiene-styrene copolymers, cis-polybutadiene, and cis-polyisoprene. The compounds can be incorporated into elastomers in amounts ranging from about 0.1 to 5.0 parts by weight per hundred parts of elastomer. Less than 0.1 part does not give adequate protection and more than 5.0 parts is not needed and is wasteful of material. Because of their good solubility in elastomeric material, the new compounds do not exhibit the undesirable tendency to "bloom" that is a characteristic of the unalyklated N,N'-diaryl-p-phenylenediamines.

The compounds of this invention can be added to dry elastomers in known ways, such as by blending on a roll mill or in the Banbury mixer, or an aqueous dispersion of the antioxidant may be added to the polymer latex.

The compounds of this invention may in general be used with any of the usual elastomer compounding ingredients such as vulcanizing agents, plasticizers, pigments, fillers, extenders, and reinforcing agents.

Representative examples illustrating the present invention are as follows. Parts are by weight unless otherwise indicated.

*Example I*

90 grams of 2,5-di-tert-butylhydroquinone are mixed with 150 grams of aniline hydrochloride and heated with agitation to melt the solids. Hydrogen chloride gas is bubbled through the molten mass for 4 to 5 hours while maintaining the temperature at 240° C. The reaction mixture is cooled to 100° C., water is added, and sodium hydroxide is added to make the system alkaline to Clayton yellow paper. Aniline is stirpped off by steam distillation, and the product is separated by filtration. The yield is 71 grams (about 65 percent of theory) of 2,5-di-tert-butyl-N,N'-diphenyl-p-phenylenediamine in the form of a grayish-white powder having a melting point of 32–34° C. The powder distills undecomposed at 240–250° C. and 0.3 mm. Hg to a colorless liquid which turns dark on the surface when contacted with air. The product is soluble in petroleum ether or acetone.

The infrared spectrum of the product shows that —OH groups are not present but that —NH— groups and tert-butyl groups are present. —NH— bands occur at 2.79, 2.94(w, sh)μ and at 7.73(s, sh), 8.03 (s, br)μ. Tert-butyl bands occur at 7.04(w, br), 7.19 and 7.37(w, sh)μ.

For further identification, the compound is oxidized with dibenzoyl peroxide in benzene at 70° C. to form the anil:

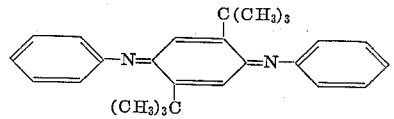

After separation by chromatography on an alumina column the anil analyzes as follows:

Found: Percent N, 8.1. Theory: Percent N, 7.6. The infrared spectrum shows C=N and tertiarybutyl groups.

*Example II*

Using essentially the same process described in Example I, 33.3 grams of 2,5-di-tert-butylhydroquinone are reacted with 50 grams of o-toluidine in the presence of hydrogen chloride. The infrared spectrum of the product shows no —OH bands and shows bands characteristic of the —NH— bond and the tert-butyl structure, confirming that the product is 2,5-di-tert-butyl-N,N'-di-o-tolyl-p-phenylenediamine.

The corresponding 2,5-di-tert-butyl-N,N'-diaryl compounds are prepared when 2,5-di-tert-butylhydroquinone is reacted by a similar process with one of the following arylamines:

p-toluidine
1-naphthylamine to yield the following compounds, respectively:

2,5-di-tert-butyl-N,N'-di-p-tolyl-p-phenylenediamine
2,5,-di-tert-butyl-N,N'-di-1-naphthyl-p-phenylenediamine

*Example III*

Natural rubber is compounded using the following recipe:

| | Parts by weight |
|---|---|
| Natural rubber smoked sheets | 100.0 |
| Easy-processing channel black | 40.0 |
| Stearic acid | 3.0 |
| Zinc oxide | 5.0 |
| Sulfur | 2.8 |
| 2-mercaptobenzothiazole | 1.0 |
| Antioxidant | 1.0 |

The compounded stock is press-cured in preheated molds for 45 minutes at 144° C. Test pieces 25 to 30 mils in thickness are subjected to accelerated aging at 121° C. for 24 hours as described in ASTM D 865–54T. Tensile properties are measured before and after aging at 25° C. using an Instron Tensile Tester and pulling at a speed of 20 inches per minute.

Test results are shown in Table I compared with those obtained from a control sample containing no antioxidant and with those obtained when N,N'-diphenyl-p-phenylenediamine is used as the antioxidant.

TABLE I

| | No Antioxidant | N,N'-diphenyl-p-phenylenediamine Antioxidant | 2,5-di-tert. butyl-N,N'-diaryl-p-phenylenediamine Antioxidant | |
|---|---|---|---|---|
| | | | Aryl is o-Tolyl | Aryl is Phenyl |
| Before Aging: | | | | |
| Tensile Strength at Break, p.s.i. | 4,490 | 4,150 | 4,800 | 4,300 |
| Elongation at Break, percent | 515 | 540 | 593 | 573 |
| After Aging: | | | | |
| Tensile Strength at Break, p.s.i. | 515 | 1,100 | 1,060 | 1,073 |
| Elongation at Break, percent | 110 | 193 | 180 | 183 |
| Tensile Strength Retained, percent | 11 | 27 | 22 | 25 |

After two-weeks' storage at room temperature the sample of cured rubber containing 2,5-di-tert-butyl-N.N'-diphenyl-p-phenylenediamine shows no bloom whereas the sample containing N,N'-diphenyl - p - phenylenediamine shows a heavy white bloom. Similar results are obtained when the 2,5-di-tert-butyl-N,N'-diphenyl-p-phenylenediamine is replaced by one of the following:

2,5-di-tert-butyl-N,N'-di-p-tolyl-p-phenylenediamine
2,5,-di-tert-butyl-N,N'-di-1-naphthyl-p-phenylenediamine Variation in the amounts of modifying ingredients used in the compounding of elastomers, such as are listed in Example III, or replacement of such ingredients by others is possible, within reason, without harmfully detracting from the utility of the new compounds as described in the foregoing description and examples.

As many widely different embodiments of this invention may be made without departing from the spirit and scope thereof, it is to be understood that this invention is not limited to the specific embodiments thereof except as defined in the appended claims.

What is claimed is:

1. A 2,5-di-tert-butyl - N,N'-diaryl-p-phenylenediamine of the formula

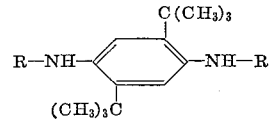

wherein R is a member selected from the group consisting of phenyl, naphthyl, lower alkyl substituted phenyl and lower alkyl substituted naphthyl.

2. 2,5-di-tert-butyl-N,N'-diphenyl-p-phenylenediamine.
3. 2,5,-di-tert-butyl-N,N'-di-o-tolyl-p-phenylenediamine.
4. 2,5-di-tert-butyl-N,N'-di-p-tolyl-p-phenylenediamine.
5. 2,5-di-tertbutyl-N,N'-di - 1 - naphthyl-p-phenylenediamine.

References Cited by the Examiner

UNITED STATES PATENTS

| 2,078,527 | 4/1937 | Clifford. | |
|---|---|---|---|
| 2,156,792 | 5/1939 | Neal et al. | 260—576 X |
| 2,213,204 | 9/1940 | Carleton | 260—576 |
| 2,476,661 | 7/1949 | Hart | 260—809 |
| 2,503,778 | 4/1950 | Stone | 260—576 |
| 2,651,667 | 9/1953 | Hill et al. | 260—809 |
| 2,820,829 | 1/1958 | Kalvinskas | 260—576 |
| 3,057,819 | 10/1962 | Kibler | 260—576 X |

CHARLES B. PARKER, *Primary Examiner.*

LEON J. BERCOVITZ, *Examiner.*

K. B. CLARKE, D. R. MAHANAND,
*Assistant Examiners.*